US011925821B2

(12) United States Patent
Canfield et al.

(10) Patent No.: US 11,925,821 B2
(45) Date of Patent: Mar. 12, 2024

(54) D-RING WITH MULTIPLE OPENINGS

(71) Applicant: Buckingham Manufacturing Company, Inc., Binghamton, NY (US)

(72) Inventors: DeForest C. Canfield, Oxford, NY (US); Jason Novak, Goreville, IL (US)

(73) Assignee: Buckingham Manufacturing Company, Inc., Binghamton, NY (US)

(*) Notice: Subject to any disclaimer, the term of this patent is extended or adjusted under 35 U.S.C. 154(b) by 0 days.

(21) Appl. No.: 18/142,678

(22) Filed: May 3, 2023

(65) Prior Publication Data

US 2023/0271037 A1 Aug. 31, 2023

Related U.S. Application Data

(63) Continuation of application No. 16/994,412, filed on Aug. 14, 2020, now Pat. No. 11,730,983.

(60) Provisional application No. 62/886,651, filed on Aug. 14, 2019.

(51) Int. Cl.

| | |
|---|---|
| ***A44B 11/00*** | (2006.01) |
| ***A44B 11/04*** | (2006.01) |
| ***A62B 35/00*** | (2006.01) |

(52) U.S. Cl.

CPC .......... *A62B 35/0037* (2013.01); *A44B 11/04* (2013.01)

(58) Field of Classification Search

CPC ............................ A44B 11/04; A62B 35/0037

See application file for complete search history.

(56) References Cited

U.S. PATENT DOCUMENTS

| | | | | | |
|---|---|---|---|---|---|
| 348,871 | A | * | 9/1886 | Wales | A41F 1/006 24/561 |
| 779,279 | A | * | 1/1905 | Hastings | A44B 11/04 24/321 |
| 2,224,773 | A | * | 12/1940 | Shaulson | A44B 11/28 24/200 |
| 2,260,060 | A | * | 10/1941 | Shaulson | A44B 11/04 24/200 |
| 2,269,696 | A | * | 1/1942 | Shaulson | A41F 11/02 24/200 |
| 2,285,714 | A | * | 6/1942 | Hirsh | A44B 11/04 24/198 |
| D133,265 | S | * | 8/1942 | Kasen | D11/218 |
| D157,386 | S | * | 2/1950 | Lombardi | D11/218 |
| D171,440 | S | * | 2/1954 | Chisholm | D11/212 |
| D217,895 | S | * | 6/1970 | Burleson | 2/245 |
| 3,653,100 | A | * | 4/1972 | Dolan | A44B 11/22 D2/639 |
| 4,778,082 | A | * | 10/1988 | Vitelle | B65D 35/28 222/103 |

(Continued)

*Primary Examiner* — Jason W San

(74) *Attorney, Agent, or Firm* — Bond, Schoeneck & King, PLLC; Frederick J. M. Price

(57) ABSTRACT

A D-ring, comprising a body having a first surface and a second surface and a plurality of apertures formed through first and second surfaces. The D-ring comprises two or more separate rated apertures for receiving a device or a connector to a device. A first aperture is formed through the first and second surfaces and positioned on the distal portion of the body. A second aperture is formed through the first and second surfaces such that the second aperture is adjacent to the first aperture. Additionally, there is a belt receiving aperture formed through said first and second surfaces positioned on the proximal portion of the body.

11 Claims, 6 Drawing Sheets

(56) References Cited

U.S. PATENT DOCUMENTS

| | | | | | |
|---|---|---|---|---|---|
| 5,103,537 | A | * | 4/1992 | Snyder | A44B 11/2553<br>24/265 R |
| 5,105,511 | A | * | 4/1992 | Shahin | A44B 11/04<br>24/200 |
| 5,605,380 | A | * | 2/1997 | Gerstenberger | B60R 22/024<br>297/483 |
| 5,608,918 | A | * | 3/1997 | Salvaggio | A44B 11/02<br>24/169 |
| 5,836,060 | A | * | 11/1998 | Profit | B60P 7/0823<br>24/698.2 |
| D435,807 | S | * | 1/2001 | Anscher | D11/200 |
| D447,091 | S | * | 8/2001 | Fildan | D11/210 |
| 6,435,940 | B1 | * | 8/2002 | Fildan | A41F 1/006<br>450/86 |
| D471,678 | S | * | 3/2003 | Hanna | D30/152 |
| 7,100,249 | B2 | * | 9/2006 | Hurn | A44B 11/04<br>24/199 |
| D545,068 | S | * | 6/2007 | Giampavolo | D6/315 |
| 7,234,995 | B2 | * | 6/2007 | Fildan | A44B 11/04<br>24/265 AL |
| D576,075 | S | * | 9/2008 | Freeman | D11/218 |
| D651,123 | S | * | 12/2011 | Kaneko | D11/218 |
| D666,525 | S | * | 9/2012 | Anderson | D11/210 |
| D709,797 | S | * | 7/2014 | Iannello | D11/218 |
| 8,764,360 | B2 | * | 7/2014 | Vick | A44B 11/04<br>410/97 |
| D710,250 | S | * | 8/2014 | Iannello | D11/218 |
| D718,186 | S | * | 11/2014 | Iannello | D11/218 |
| 9,027,515 | B2 | * | 5/2015 | Fidrych | A01K 27/00<br>119/858 |
| D750,850 | S | * | 3/2016 | Javornick | D30/152 |
| D750,851 | S | * | 3/2016 | Whitfield | D30/152 |
| D782,364 | S | * | 3/2017 | Nykoluk | D11/218 |
| D792,749 | S | * | 7/2017 | Faro | D8/19 |
| D799,372 | S | * | 10/2017 | Paik | D11/218 |
| D822,537 | S | * | 7/2018 | Smuin | D11/218 |
| D829,388 | S | * | 9/2018 | Chao | D30/158 |
| D836,422 | S | * | 12/2018 | Gobbi | D8/356 |
| D839,084 | S | * | 1/2019 | Mikoska | D8/356 |
| D842,070 | S | * | 3/2019 | Kisling | D8/19 |
| D843,887 | S | * | 3/2019 | Frost | D11/218 |
| D859,130 | S | * | 9/2019 | Spater | D8/356 |
| D863,101 | S | * | 10/2019 | Chang | D11/218 |
| D867,857 | S | * | 11/2019 | Ruddick | D8/356 |
| D869,263 | S | * | 12/2019 | Cowell | D8/356 |
| D896,046 | S | * | 9/2020 | Spater | D8/356 |
| D896,695 | S | * | 9/2020 | Falvai | D11/218 |
| D904,143 | S | * | 12/2020 | Hollinger | D8/19 |
| D913,843 | S | * | 3/2021 | Noble | D11/208 |
| D939,942 | S | * | 1/2022 | Petzl | D8/356 |
| D947,653 | S | * | 4/2022 | Caprio | D8/356 |
| D951,069 | S | * | 5/2022 | Petzl | D8/356 |
| D951,905 | S | * | 5/2022 | Gao | D14/205 |
| D954,365 | S | * | 6/2022 | Baronoff | D30/199 |
| D968,094 | S | * | 11/2022 | Gorham | D3/200 |
| 2005/0067222 | A1 | * | 3/2005 | Casebolt | A62B 35/0037<br>182/30 |
| 2006/0026804 | A1 | * | 2/2006 | Lee | A63B 33/004<br>24/200 |
| 2007/0089277 | A1 | * | 4/2007 | Bacalso | A44B 11/2503<br>24/200 |
| 2007/0163088 | A1 | * | 7/2007 | Gracer | A44B 11/04<br>24/198 |
| 2007/0175005 | A1 | * | 8/2007 | Latronica | A41F 1/00<br>24/198 |
| 2014/0060966 | A1 | * | 3/2014 | Patel | A44B 11/04<br>24/265 AL |
| 2014/0109351 | A1 | * | 4/2014 | Fennell | A44B 18/0003<br>24/198 |
| 2015/0196099 | A1 | * | 7/2015 | Strum | A41F 15/02<br>24/200 |
| 2017/0120087 | A1 | * | 5/2017 | Cowell | A62B 35/0006 |
| 2018/0154196 | A1 | * | 6/2018 | Cowell | A62B 35/0037 |
| 2018/0343982 | A1 | * | 12/2018 | Chang | A44B 11/02 |
| 2019/0001165 | A1 | * | 1/2019 | Schurian | A44B 13/0029 |
| 2019/0313746 | A1 | * | 10/2019 | Hetrich | A62B 35/0025 |
| 2020/0155879 | A1 | * | 5/2020 | Chang | A62B 35/0037 |
| 2020/0188710 | A1 | * | 6/2020 | Roseveare, Jr. | E04G 21/3276 |
| 2020/0230445 | A1 | * | 7/2020 | Auston | A62B 35/0037 |

* cited by examiner

D-RING WITH MULTIPLE OPENINGS

CROSS-REFERENCE TO RELATED APPLICATION

This application is a continuation of U.S. patent application Ser. No. 16/994,412, filed on Aug. 14, 2020, which claims priority to U.S. Provisional Patent Application Ser. No. 62/886,651, filed on Aug. 14, 2019 and entitled "D-RING WITH MULTIPLE OPENINGS" the entirety of which is hereby incorporated by reference.

BACKGROUND OF THE INVENTION

1. Field of the Invention

The present invention is directed generally to D-rings for body belts of the type generally used by linemen for supporting them atop a pole or other similar object and, more particularly, to a D-ring device with multiple openings.

2. Description of the Related Art

In the electrical power distribution, telecommunications, and other similar industries, linemen are called upon to install and service apparatuses and wiring disposed upon poles and other elevated structures. This generally requires that a lineman climb a pole and secure himself or herself in a safe, comfortable position to allow use of both hands to perform the required task atop the pole.

A fundamental item of work positioning equipment for use by linemen and others engaged in aerial tasks is known as a body belt. Body belts for use by lineman and other persons needing to work in elevated locations are well known and widely used. Such body belts are sized and configured to snugly encircle the hips of a lineman. As used herein, the term lineman and its plural, linemen, are intended to encompass any person or persons needing to securely work in an elevated location such as atop a pole.

Body belts of the prior art typically include a pair of D-rings or similar attachment points. As used herein, the term D-ring is intended to include any and all possible shapes and sizes of attachment rings or similar devices suitable for use on a body belt. The belts are provided in a variety of sizes to fit linemen having varying waist measurements. When properly sized, the back bar of the work positioning D-rings of the body belt are located at the prominent part of one hipbone to the same point on the other hipbone. This position is believed to result in maximal convenience and safety.

Typically, when the lineman encounters an obstacle which he/she must traverse, certain safety equipment must be detached and then reattached once the lineman has passed the obstacle. The time period during which one or more ancillary safety devices are detached is typically more dangerous for the lineman. Also, the crowding of the D-rings of a body belt of the prior art, because of the possible numerous safety devices or other items attached thereto, also increases the risk that the lineman may inadvertently detach the wrong snap hook from the D-ring, thereby exposing himself/herself to danger of falling. The increased amount of concentration required to sort out numerous devices from a crowded D-ring also increases the risk of an accident. Therefore, there is a need for a D-ring that allows the lineman to safely connect multiple devices thereto in a separated manner so that the lineman can easily distinguish the connection of each device with fewer total D-rings.

Description of the Related Art Section Disclaimer: To the extent that specific patents/publications/products are discussed above in this Description of the Related Art Section or elsewhere in this disclosure, these discussions should not be taken as an admission that the discussed patents/publications/products are prior art for patent law purposes. For example, some or all of the discussed patents/publications/products may not be sufficiently early in time, may not reflect subject matter developed early enough in time and/or may not be sufficiently enabling so as to amount to prior art for patent law purposes. To the extent that specific patents/publications/products are discussed above in this Description of the Related Art Section and/or throughout the application, the descriptions/disclosures of which are all hereby incorporated by reference into this document in their respective entirety(ies).

SUMMARY OF THE INVENTION

It is therefore a principal object and advantage of the present invention to provide a D-ring that can safely and separately connect two devices. In particular, the D-ring comprises two or more separate rated openings for receiving a device or a connector to a device. In an embodiment, the openings are D-shaped. In another embodiment, the openings are circular. The openings may have any other suitable geometry and one opening may have a different geometry compared to that of any other opening on the D-ring.

As stated above, the present invention allows the connections to devices on the D-ring to be close together but also separate. This keeps the user's climbing connections separate, while maintaining a compact connection area on the body belt. Further, the close, separate connections help reduce the overall weight of the body belt and can reduce the size of the body belt. For example, the close, separate connections allow the belt to maintain the advantages of a four D-ring belt while maintaining the size of a two D-ring belt.

BRIEF DESCRIPTION OF THE DRAWINGS

The present invention will be more fully understood and appreciated by reading the following Detailed Description in conjunction with the accompanying drawings, in which.

DETAILED DESCRIPTION

Figure 1:
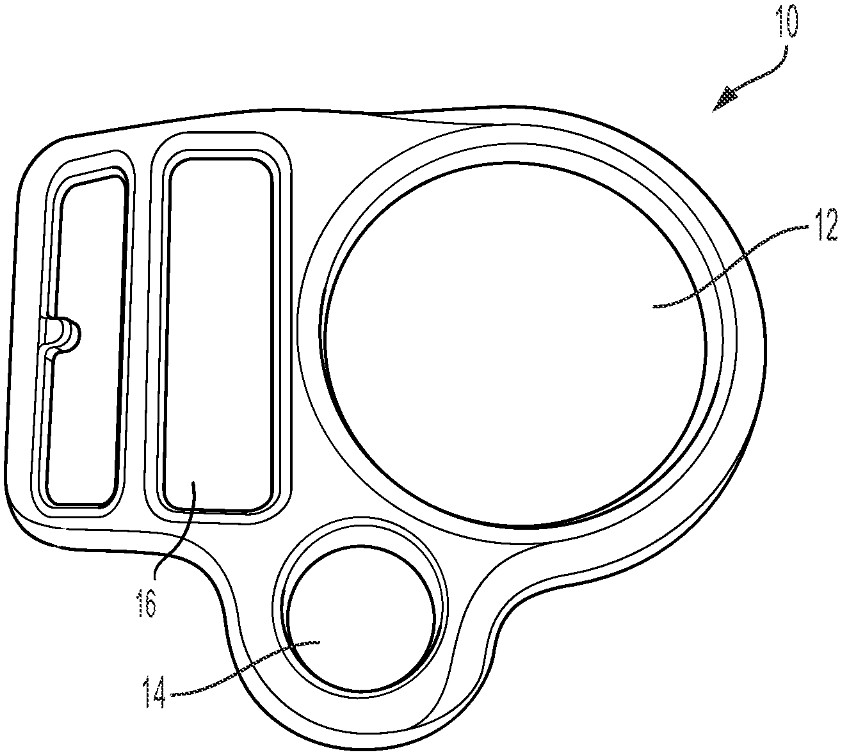
FIG. 1 is a perspective view of a D-ring with multiple openings, in accordance with an embodiment.

The D-ring with multiple openings 10 comprises a body having opposing first and second surfaces, and a proximal and distal portion. The first surface defines the first plane and the second surface defines the second plane. The body of D-ring 10 forms two close, separate openings (first opening 12 and second opening 14), with at least first opening 12 being in the distal portion and a belt receiving aperture 16 on the proximal portion. Openings 12 and 14 are on the same plane and formed through the first surface and second surface. Belt receiving aperture 16 similarly is formed through the first surface and second surface. Belt receiving aperture 16 can have two apertures as shown, in another embodiment there is only one aperture.

First opening 12 has a first diameter and second opening 14 has a second diameter. In the embodiment shown first diameter of first opening 12 is larger than the second diameter of second opening 14. First and second diameter can be any size such that the D-ring 10 can be received by and receive multiple tools, at least one in each opening 12 and 14. As shown, opening 12 comprises a significant portion of the surface area of the total body. In another example, openings 12 and 14 have the same diameter.

Openings 12 and 14 are dimensioned within the D-ring so as to receive and connect to a tool such as a carabiner, clip, or rope. The outer portion the body of the D-ring 10 surrounding openings 12 and 14 are thin enough to be received by a tool. The portion the body between openings 12 and 14 should be small enough that openings 12 and 14 are within close proximity of one another.

There can be any number of openings 12 and 14 formed within the body. Depicted in FIGS. 1-5 is an example of an embodiment with two holes. In another example, but in another example there is a third opening. As shown, first opening 12 is positioned adjacent to and along a similar position on the y-axis to the belt receiving aperture 16. Second opening 14 is in close proximity to but lower along the y-axis than both the first opening 12 and the belt reviving aperture 16.

Figure 6:
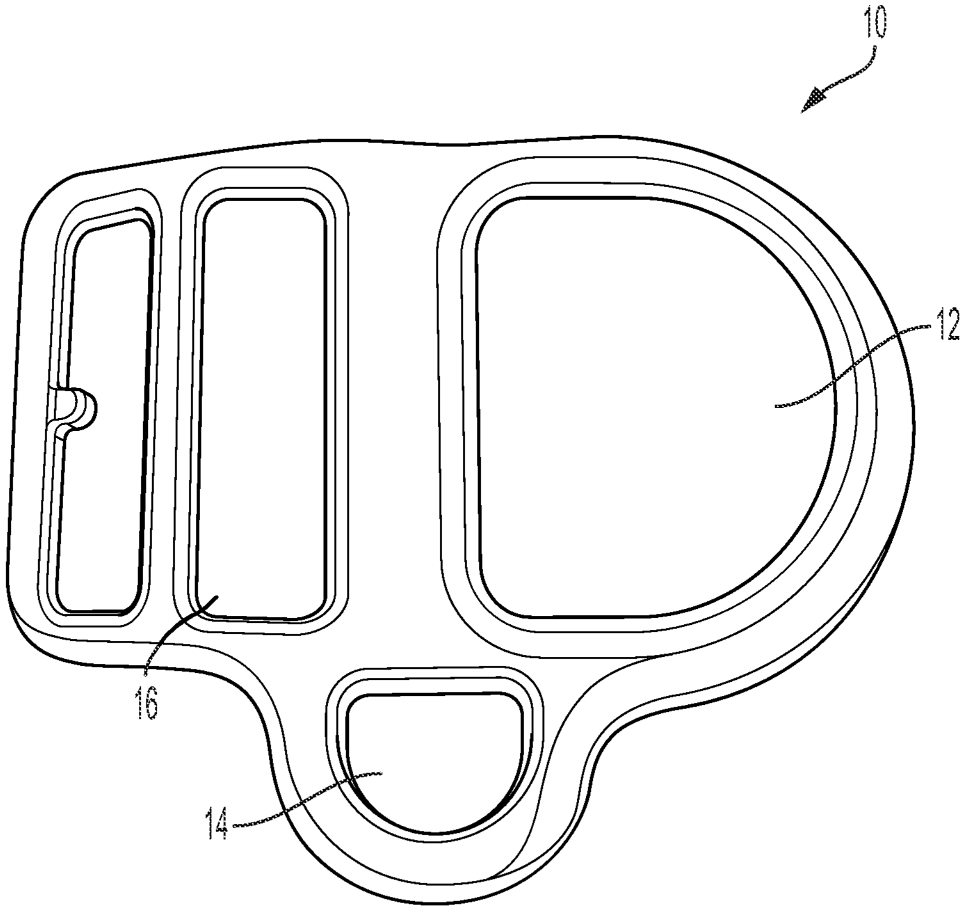
FIG. 6 is a side view of a D-ring with multiple openings, in accordance with an embodiment.

In the embodiment shown in FIG. 1 the first opening 12 and second opening 14 are both circular. Openings 12 and 14 can be any shape such as but not limited to circular, oval, or D-shaped (FIG. 6). A rounded edge of the openings allows an attached clip or carbineer to easily slide along the edge. In another embodiment, the openings can have different shapes, for example first opening 12 can be circular while second opening 14 can be oval.

Belt receiving aperture 16 is dimensioned within the D-ring 10 so as to receive a body belt and/or connect to a body belt. Belt receiving aperture 16 formed in the proximal portion of the D-ring to allow the body belt to be attached to the bar and the other slot is for the belt strap to pass through. The current version is a double bar model and has two apertures, in another embodiment there is a single bar that has one aperture.

Figure 2:
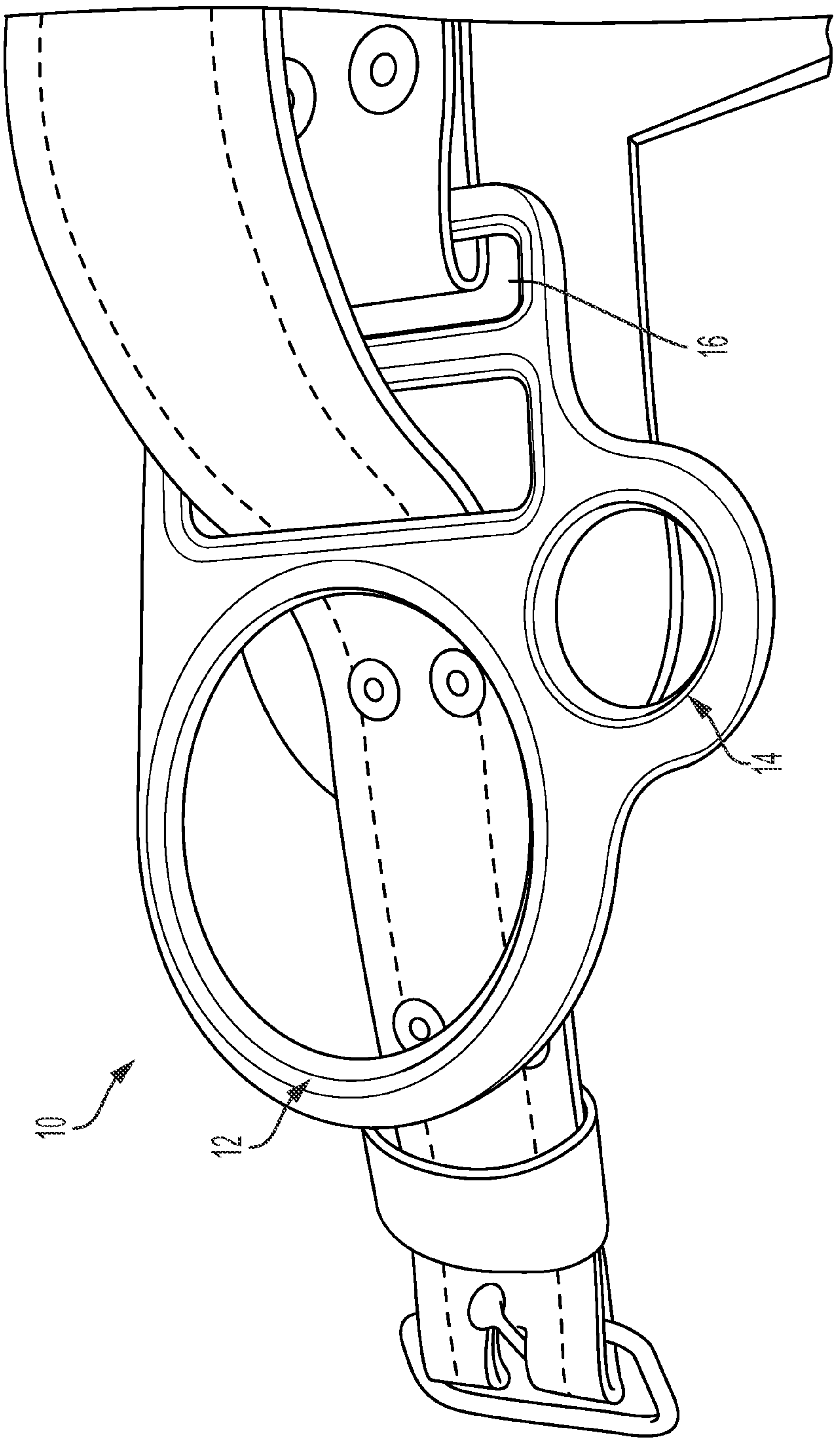
FIG. 2 is a perspective view of a D-ring with multiple openings, in accordance with an embodiment.

FIGS. 2-5 show a D-ring on a body belt. Referring now to FIG. 2, the interior edge of the D-ring is radiused. Belt receiving aperture 16 is positioned on the proximal portion and adjacent to openings 12 and 14. As shown, the bar/outer edge forming the first belt receiving aperture 16 is encompassed by a portion of the body belt and another portion of the body belt is passed through the second belt receiving aperture 16.

Figure 3:
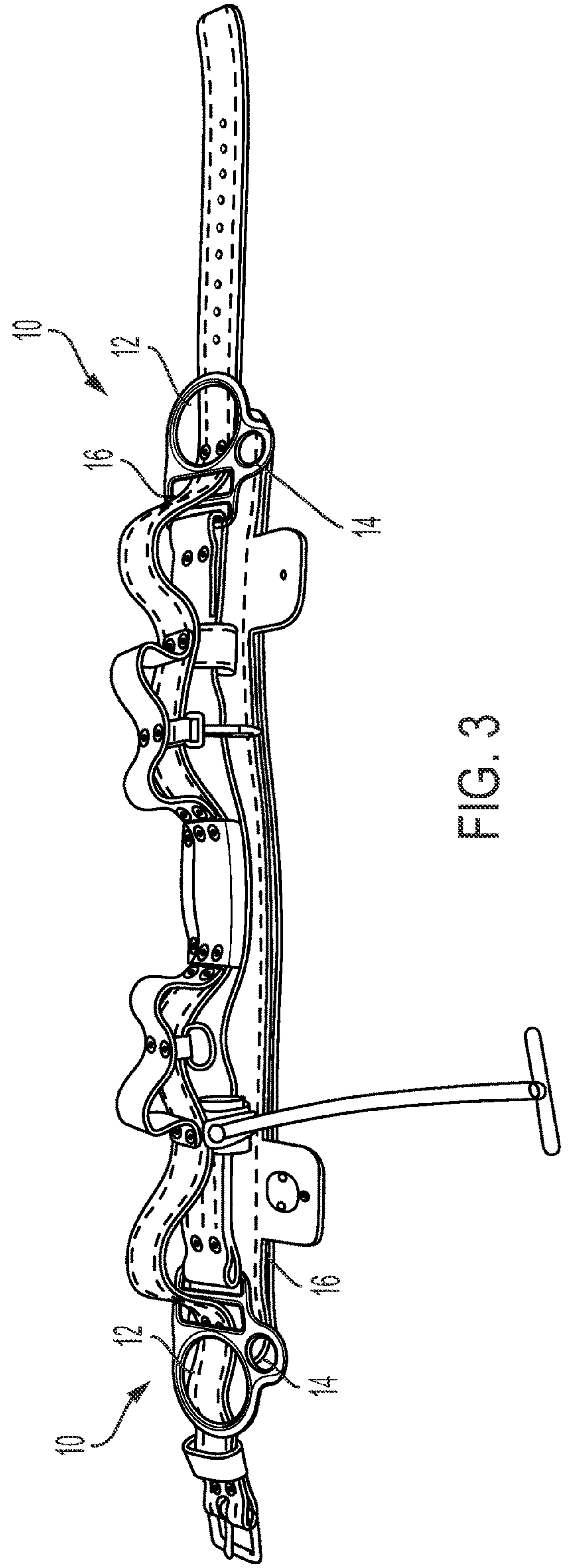
FIG. 3 is a perspective view of a D-ring with multiple openings, in accordance with an embodiment.
Figure 4:
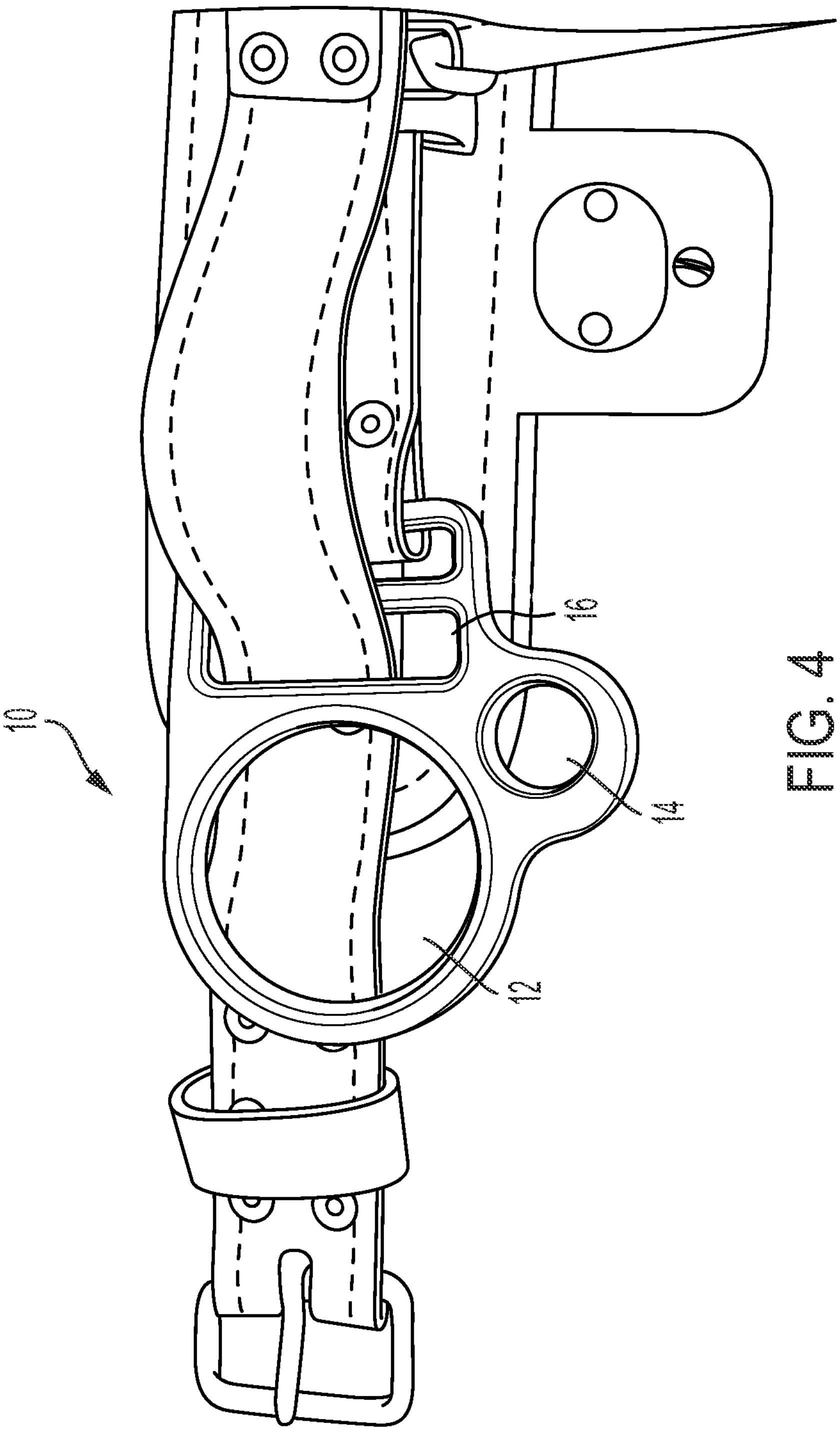
FIG. 4 is a perspective view of a D-ring with multiple openings, in accordance with an embodiment.

Referring now to FIG. 3 there is shown two D-rings 10 attached to a body belt. The body belt comprises a body pad having an outermost surface and an opposing innermost surface, each extending between a top perimeter and a bottom perimeter. Body belt further has a belt strap and a buckle is securely fastened to belt strap at one end of the body belt. The D-rings of the body belt form attachment points. In FIG. 4 there is shown a close up of one D-ring 10 attached to the body belt.

Figure 5:
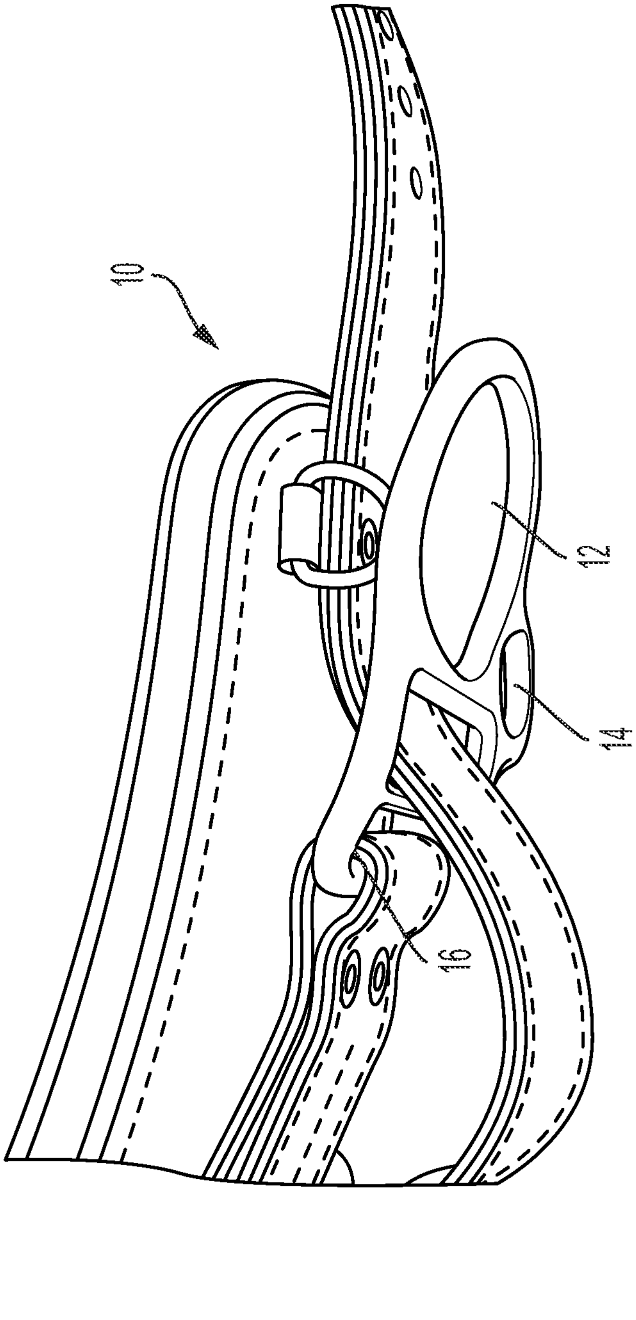
FIG. 5 is a side view of a D-ring with multiple openings, in accordance with an embodiment.

In FIG. 5 there is shown a side view of a D-ring on a body belt. In this embodiment, the first and second surface of the proximal portion follow a slight curve. The D-ring can be manufactured out of any metal such as but not limited to steel, aluminum, or titanium. The D-ring can meet industry standards such as the American National Standards Institute Z359.12 standard such that the D-ring has a 5,000 lbf. minimum tensile strength without breaking.

While embodiments of the present invention has been particularly shown and described with reference to certain exemplary embodiments, it will be understood by one skilled in the art that various changes in detail may be effected therein without departing from the spirit and scope of the invention as defined by claims that can be supported by the written description and drawings. Further, where exemplary embodiments are described with reference to a certain number of elements it will be understood that the exemplary embodiments can be practiced utilizing either less than or more than the certain number of elements.

What is claimed is:

1. A D-ring device, comprising:

a body having a first surface and a second surface extending in spaced relation to one another and further comprising a proximal portion and a distal portion;

a main body area formed between a first outer edge extending in a first plane and a second outer edge extending in a second plane substantially parallel to the first plane;

a body extension area extending from the second outer edge of the main body area;

a first aperture having a first diameter formed through said first and second surfaces positioned on the distal portion of the body within the main body area;

a second aperture having a second diameter formed through said first and second surfaces such that the second aperture is adjacent to the first aperture and positioned in between the distal and proximal portions of the body wherein the majority of the second aperture is positioned outside of the main body area wherein the first diameter is at least two times larger than the second diameter; and a first belt receiving aperture formed through said first and second surfaces wherein the first belt receiving aperture is positioned on the proximal portion of the body within the main body area; and a second belt receiving aperture, directly adjacent to and extending in a parallel direction along a length of the proximal portion of the body coincident with the first belt receiving aperture, formed through said first and second surfaces wherein the second belt receiving aperture is positioned on the proximal portion of the body within the main body area.

2. The device of claim 1, wherein portion of the body forming the first aperture is rounded such that the aperture is circular.

3. The device of claim 1, wherein portion of the body forming the first aperture is partially rounded such that the aperture is D-shaped.

4. The device of claim 1, wherein portion of the body forming the second aperture is rounded such that the aperture is circular.

5. The device of claim 1, wherein portion of the body forming the second aperture is partially rounded such that the aperture is D-shaped.

6. The device of claim 1, wherein the first aperture has an inner edge that is radiused.

7. The device of claim 1, wherein the second belt receiving aperture comprises a tab.

8. A D-ring device, comprising:

a body having a first surface and a second surface extending in spaced relation to one another and further comprising a proximal portion and a distal portion;

a main body area formed between a first outer edge extending in a first plane and a second outer edge extending in a second plane substantially parallel to the first plane;

a body extension area extending from the second outer edge of the main body area;

a first circular shaped aperture formed through said first and second surfaces, having a first diameter and positioned on the distal portion of the body within the main body area;

a second circular shaped aperture formed through said first and second surfaces having a second diameter and positioned such that the second circular shaped aperture is adjacent to the first circular shaped aperture and positioned in between the distal and proximal portions of the body and wherein the first diameter is larger than the second diameter, wherein the entirety of the second aperture is positioned outside of the main body area;

a first belt receiving aperture formed through said first and second surfaces wherein the belt receiving aperture is positioned on the proximal portion of the body within the main body area; and a second belt receiving aperture formed through said first and second surfaces wherein the second belt receiving aperture is positioned on the proximal portion of the body and directly adjacent to and extending in a parallel direction along a length of the proximal portion of the body coincident with the first belt receiving aperture within the main body area.

9. The device of claim 8, wherein the first aperture has an inner edge that is radiused.

10. The device of claim 8, wherein the second belt receiving aperture comprises a tab.

11. The device of claim 8, the body comprising a vertical axis between the first aperture and the belt receiving portion within the main body area in which the body bends along.

* * * * *